(12) United States Patent
Yamazaki et al.

(10) Patent No.: US 7,378,753 B2
(45) Date of Patent: May 27, 2008

(54) VEHICULAR AUTOMATIC LIGHT CONTROL APPARATUS

(75) Inventors: Masayuki Yamazaki, Utsunomiya (JP); Masahiko Asakura, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 163 days.

(21) Appl. No.: 11/203,803

(22) Filed: Aug. 15, 2005

(65) Prior Publication Data
US 2006/0108932 A1    May 25, 2006

(30) Foreign Application Priority Data
Aug. 25, 2004    (JP) ............................. 2004-245532

(51) Int. Cl.
*B60L 1/14* (2006.01)
(52) U.S. Cl. .................. 307/10.8; 340/438; 315/82
(58) Field of Classification Search .............. 307/10.8, 307/10.1; 340/438, 602; 315/82; 318/483; 382/104
See application file for complete search history.

(56) References Cited

U.S. PATENT DOCUMENTS

| | | | |
|---|---|---|---|
| 5,374,852 | A |  | 12/1994 Parkes |
| 6,218,741 | B1 | * | 4/2001 Braun et al. .............. 307/10.1 |
| 6,254,259 | B1 |  | 7/2001 Kobayashi |
| 6,343,869 | B1 |  | 2/2002 Kobayasi |
| 7,049,950 | B2 | * | 5/2006 Schmitt et al. .............. 340/468 |

| | | |
|---|---|---|
| 2004/0008110 A1 | 1/2004 | Stam et al. |
| 2005/0218723 A1 | 10/2005 | Yamazaki et al. |

FOREIGN PATENT DOCUMENTS

| | | |
|---|---|---|
| DE | 197 56 574 A 1 | 10/1998 |
| DE | 199 22 735 A 1 | 12/1999 |
| EP | 1 555 157 A1 | 7/2005 |
| JP | 60-163744 | 8/1985 |
| JP | 2000-168435 | 6/2000 |
| JP | 2004-103519 | 3/2004 |
| JP | 2005-289113 | 10/2005 |
| WO | WO 0140021 A1 * | 6/2001 |
| WO | WO 02/081260 A1 * | 10/2002 |

* cited by examiner

*Primary Examiner*—Michael J Sherry
*Assistant Examiner*—Daniel Cavallari
(74) *Attorney, Agent, or Firm*—Carrier Blackman & Associates, P.C.; Joseph P. Carrier; William D. Blackman

(57) ABSTRACT

A headlight is turned on if an external illuminance value outside of the vehicle is equal to or lower than a first threshold value if the non-rainfall state is judged from windshield wiper activation, and is permitted to be turned on if the external illuminance value is equal to or lower than a second threshold value higher than the first predetermined illuminance value if the rainfall state is judged. When the vehicle is capable of being driven and the headlight is turned on, if an average illuminance value of the external illuminance value is equal to or higher than a predetermined value, then the second threshold value switches to the first threshold value. When the headlight is turned off, if the activation of the wiper has not been confirmed for a first predetermined period, then the second threshold value switches to the first threshold value.

11 Claims, 6 Drawing Sheets

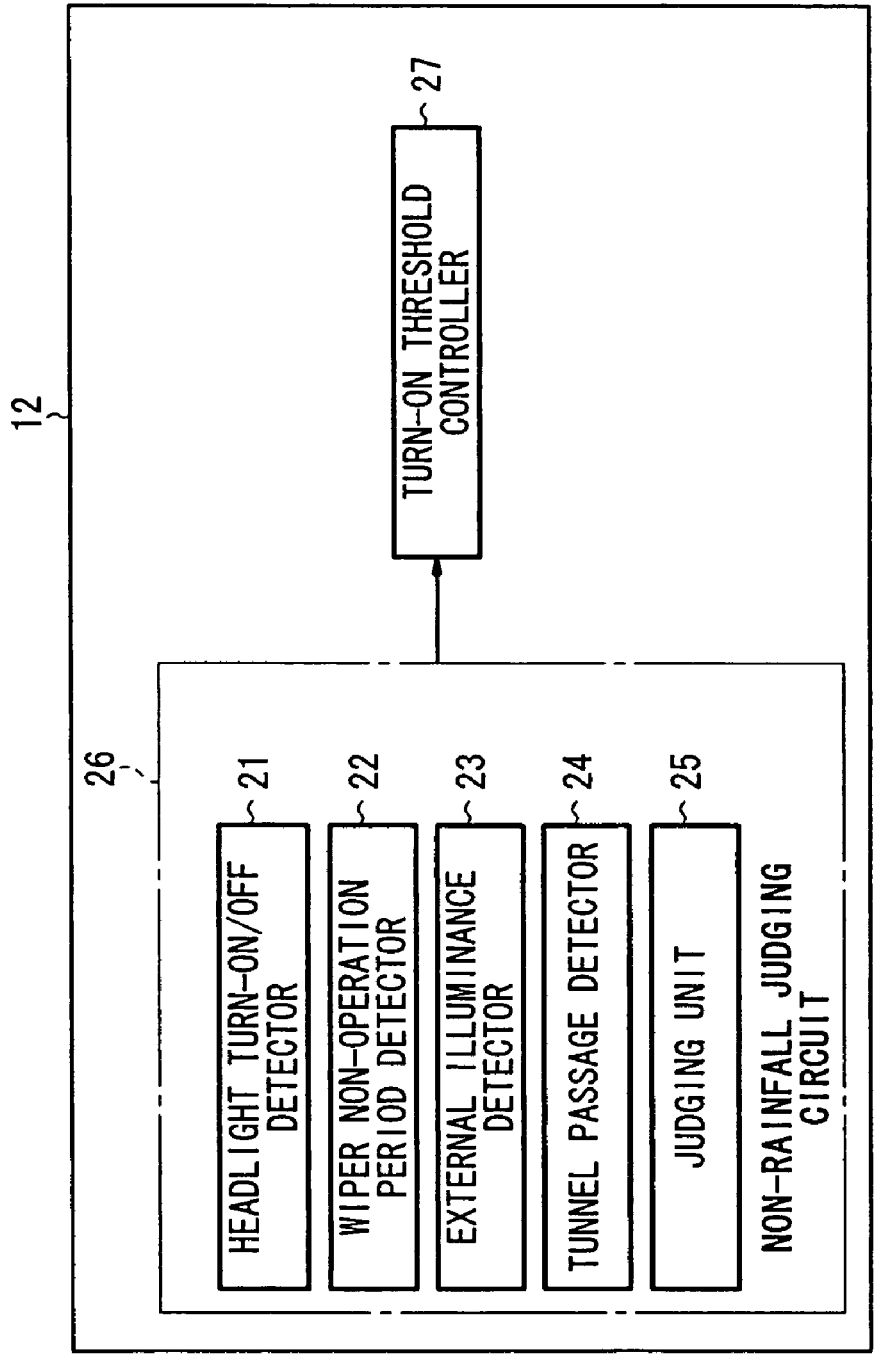

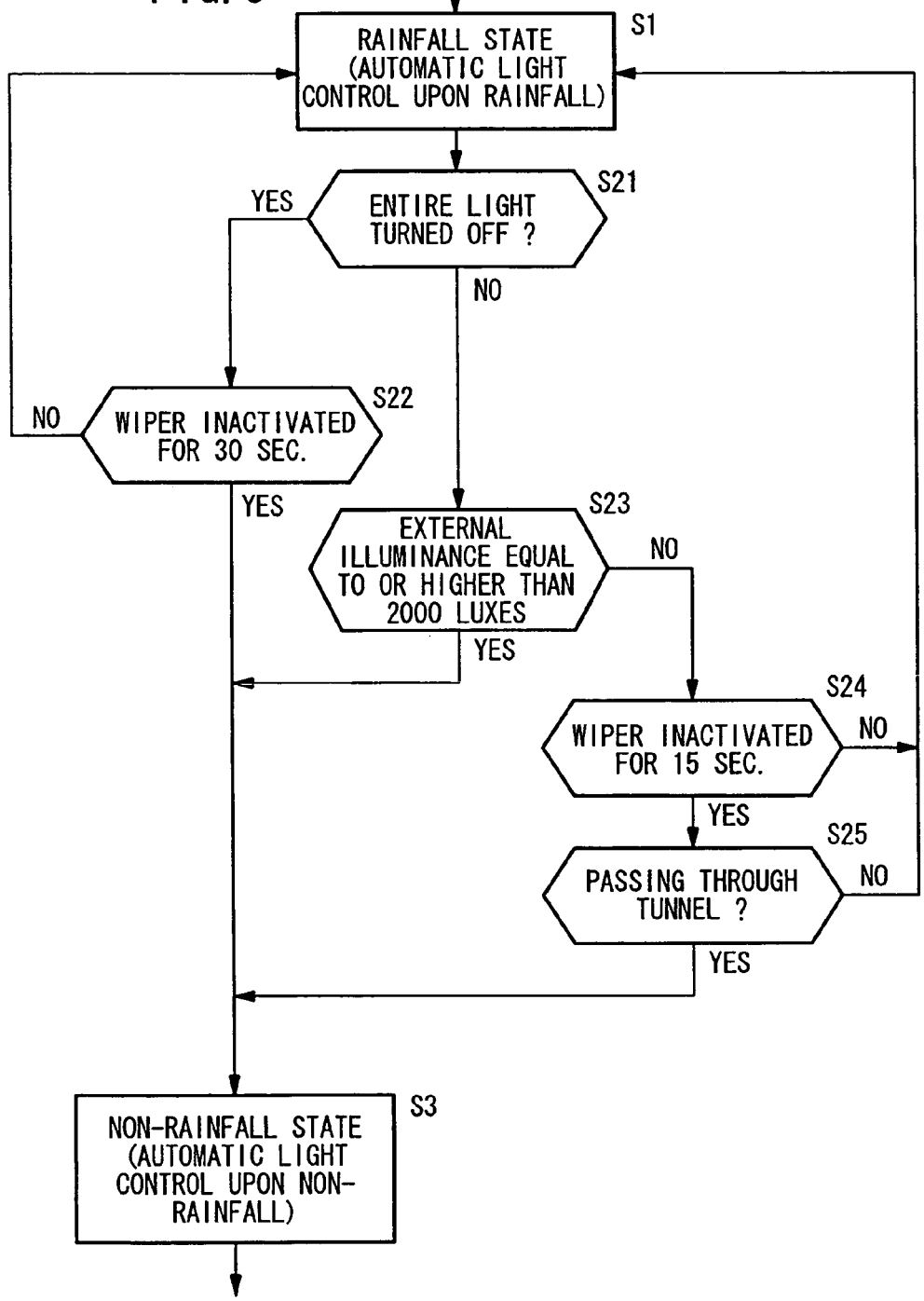

VEHICULAR AUTOMATIC LIGHT
CONTROL APPARATUS

BACKGROUND OF THE INVENTION

1. Field of the Invention

The present invention relates to a vehicular automatic light control apparatus for automatically turning on and off vehicular headlights, and more particularly to a vehicular automatic light control apparatus for determining a shift from a rainfall state to a non-rainfall state and automatically controlling a headlight from a turned-on state to a turned-off state.

2. Description of the Related Art

Heretofore, there has been known a method of and an apparatus for automatically operating vehicular headlights by measuring a period of time in which a windshield wiper has operated and the number of cycles in which the windshield wiper has wiped the windshield in each of intermittent, low-speed, and high-speed modes of operation of the windshield wiper, and judging a rainfall when the period of time and the number of cycles have reached respective values. See, for example, Japanese Laid-Open Patent Publication No. 2000-168435.

The applicant has proposed a rainfall determining device for judging a rainfall based on information as to the wiping operation of a windshield wiper. According to the proposed rainfall determining device, a wiping operation detecting means detects each wiping operation of the windshield wiper, and a timer starts measuring a predetermined period of time in each detected wiping operation. A counter counts the number of cycles in the predetermined period of time in which the windshield wiper has wiped the windshield, and if the count is detected successively a predetermined number of times, then a judging means judges a rainfall. For details, reference should be made to Japanese Patent Application No. 2004-103519.

The conventional arrangement disclosed in Japanese Laid-Open Patent Publication No. 2000-168435 requires a dedicated timer and a dedicated counter for each of the operation modes of the windshield wiper, the timer and the counter being controlled under different conditions in the respective modes. The disclosed apparatus for judging a rainfall is complex in structure. The disclosed method and apparatus turn on the headlights when a rainfall is judged depending on the operation mode of the windshield wiper, and do not judge a non-rainfall state.

The proposal according to Japanese Patent Application No. 2004-103519 also judges a rainfall and does not judge a non-rainfall state.

As described above, there has not been any conventional non-rainfall judging apparatus for determining a shift from a rainfall state to a non-rainfall state.

SUMMARY OF THE INVENTION

It is an object of the present invention to provide a vehicular automatic light control apparatus for determining a shift from a rainfall state to a non-rainfall state and automatically controlling headlights from a turned-on state to a turned-off state.

According to the present invention, there is provided a vehicular automatic light control apparatus for judging a non-rainfall state or a rainfall state based on information about wiping operation of a windshield wiper of a vehicle, turning on a headlight if an external illuminance value outside of the vehicle is equal to or lower than a first predetermined illuminance value as a first threshold value if the non-rainfall state is judged, and permitting the headlight to be turned on if the external illuminance value is equal to or lower than a second predetermined illuminance value as a second threshold value higher than the first predetermined illuminance value if the rainfall state is judged, comprising average illuminance value calculating means for determining an average illuminance value of the external illuminance value in each predetermined period when the vehicle is capable of being driven, and switching means for switching from the second threshold value to the first threshold value under different conditions based on whether the headlight is turned on or off, wherein the switching means switches from the second threshold value to the first threshold value under such a condition that the determined average illuminance value is equal to or greater than a predetermined value when the headlight is turned on, and switches from the second threshold value to the first threshold value under such a condition that the wiping operation of the wiper has not been confirmed for a first predetermined period when the headlight is turned off.

The vehicular automatic light control apparatus may further comprises tunnel detecting means for detecting when the vehicle is passing through a tunnel, wherein the switching means switches from the second threshold value to the first threshold value under such a condition that the wiping operation of the wiper has not been confirmed for a second predetermined period and the vehicle is passing through a tunnel as detected by the tunnel detecting means when the headlight is turned on and the determined average illuminance value is less than the predetermined value.

In the vehicular automatic light control apparatus, the tunnel detecting means detects when the vehicle is passing through a tunnel by detecting a predetermined external illuminance value in each predetermined period.

With the vehicular automatic light control apparatus according to the present invention, the rainfall state and the non-rainfall state are judged based on the information about the wiping operation of the windshield wiper. When the non-rainfall state is judged, then the headlight is turned on if the external illuminance value outside of the vehicle is equal to or lower than the first predetermined illuminance value as the first threshold value. When the rainfall state is judged, then the headlight is permitted to be turned on if the external illuminance value is equal to or lower than the second predetermined illuminance value as the second threshold value higher than the first predetermined illuminance value. When the vehicle is capable of being driven, the average illuminance value calculating means calculates the average illuminance value of the external illuminance value in each predetermined period. When the second threshold is applied, The switching means switches from the second threshold value to the first threshold value under different conditions based on whether the headlight is turned on or off.

The different conditions are given as follows: The switching means switches from the second threshold value to the first threshold value under such a condition that the determined average illuminance value is equal to or greater than a predetermined value when the headlight is turned on, and switches from the second threshold value to the first threshold value under such a condition that the wiping operation of the wiper has not been confirmed for a first predetermined period when the headlight is turned off.

Specifically, when the headlight is turned on, the condition for switching from the rainfall state to the non-rainfall state is satisfied if the calculated average illuminance value of the external illuminance value is equal to or greater than the predetermined value, and when the headlight is turned off, the condition for switching from the rainfall state to the non-rainfall state is satisfied if the wiping operation of the wiper has not been confirmed for the first predetermined period. Thus, second threshold value is switched to the first threshold value. For determining the switching conditions, it is only necessary to calculate the average illuminance value and confirm that the wiping operation of the wiper has not been confirmed for the predetermined period.

With the vehicular automatic light control apparatus according to the present invention, when the headlight is turned on and the determined average illuminance value is less than the predetermined value, the condition to switch from the rainfall state to the non-rain fall state is satisfied and the switching means switches from the second threshold value to the first threshold value if the wiping operation of the wiper has not been confirmed for a second predetermined period and the vehicle is passing through a tunnel. This switching condition can also be judged with ease.

With the vehicular automatic light control apparatus according to the present invention, the passage of the vehicle through a tunnel is detected by detecting a predetermined external illuminance value in each predetermined period. The detection can easily be done by detecting light, e.g., light emitted from sodium-vapor lamps in the tunnel.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a block diagram of an automatic light controller of the vehicular automatic light control apparatus according to the embodiment of the present invention;

FIG. 5 is a flowchart of an operation sequence of the vehicular automatic light control apparatus according to the embodiment of the present invention.

DESCRIPTION OF THE PREFERRED EMBODIMENT

Figure 1:
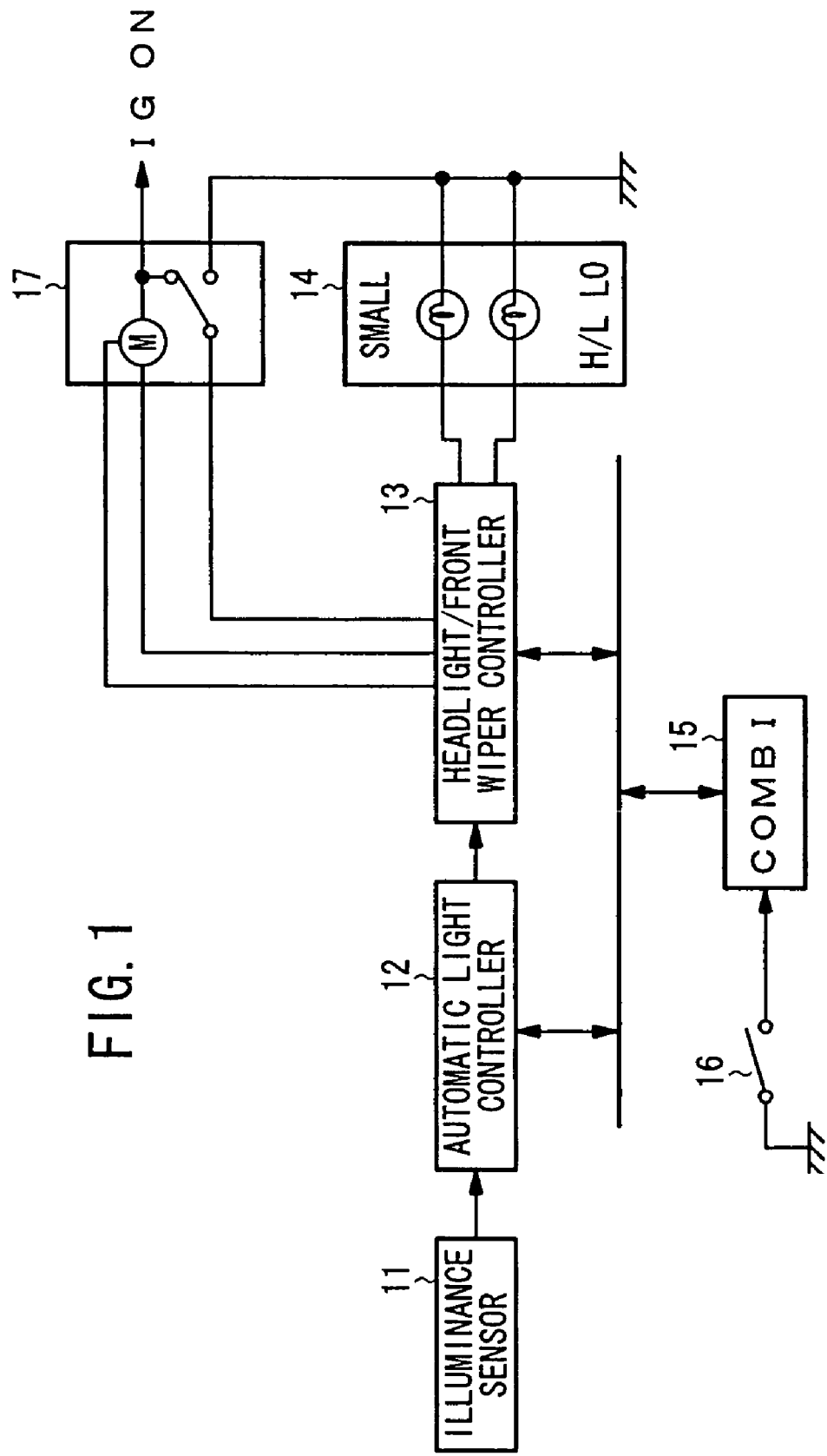
FIG. 1 is a block diagram of a vehicular automatic light control apparatus according to an embodiment of the present invention.

FIG. 1 shows in block form a vehicular automatic light control apparatus according to an embodiment of the present invention.

The vehicular automatic light control apparatus according to the embodiment of the present invention is incorporated in a vehicle and is combined with a non-rainfall judging system. As shown in FIG. 1, the vehicular automatic light control apparatus has an illuminance sensor 11 for detecting the illuminance outside of the vehicle in the environment in which the vehicle travels, an automatic light controller 12 comprising a microcomputer as a multiplex circuit for being supplied with a detected signal from the illuminance sensor 11, and a headlight/front wiper controller 13 for controlling actual loads of various devices in response to a command signal from the automatic light controller 12.

When the ignition switch of the vehicle is turned on and an automatic light switch 16 is turned on, the automatic light controller 12 is supplied with an automatic light switch signal through a combination switch 15 and is also supplied with a detected signal representing an external illuminance from the illuminance sensor 11. Based on the automatic light switch signal and the detected signal representing the external illuminance, the automatic light controller 12 determines whether a headlight 14 is to be turned on or off. The automatic light controller 12 supplies a turn-on/off command signal depending on whether the headlight 14 is to be turned on or off to the headlight/front wiper controller 13, which turns on or off a low-beam lamp and a small lamp of the headlight 14. The headlight/front wiper controller 13 is supplied with a headlight backup signal from the automatic light controller 12.

The headlight/front wiper controller 13 also controls operation of a wiper motor 17. The wiper motor 17 has a drive shaft connected to a front windshield wiper (also referred to as a wiper), not shown, through a slider crank mechanism. Each time the driver shaft makes one revolution, the wiper operates in one wiping cycle. When the ignition switch is turned on, the wiper motor 17 is controlled by the headlight/front wiper controller 13 to operate the wiper in an operation mode which is selected by the combination switch 15. A wiper non-operation period and a wiper operation period are detected from the period in which the drive shaft operates.

The combination switch 15 is capable of selecting a wiper off state and three wiper operation modes including an intermittent mode, a low-speed mode, and a high-speed mode. The wiper non-operation period and the wiper operation period are detected based on whether a wiper operation signal changes or not. Specifically, the wiper non-operation period is detected as being continuous for a preset first period, e.g., 30 seconds, or for a preset second period, e.g., 15 seconds.

The wiper motor 17 outputs a wiper operation signal each time the drive shaft makes one revolution, i.e., each time the wiper operates in one wiping cycle. The wiper operation signal represents turn-on and -off states of wiping operation of the wiper, and is supplied through the headlight/front wiper controller 13 to the automatic light controller 12. If on and off signals of the wiper operation are repeated successively a predetermined number of times, then the automatic light controller 12 judges that there is a rainfall in the environment outside of the vehicle. If on and off signals of the wiper operation are not output for a predetermined period, as described later on, i.e., if the wiper is not operated for the predetermined period, then the automatic light controller 12 judges that there is no rainfall in the environment outside of the vehicle. Dependent on the judgment, the automatic light controller 12 changes a threshold value for illuminance in turning on and off the headlight 14.

A non-rainfall state and a rainfall state are thus judged based on the information as to wiping operation of the wiper. If a non-rainfall state is judged, then the automatic light controller 12 turns on the headlight 14 when the value of external illuminance outside of the vehicle is equal to or lower than a first predetermined illuminance value as a first threshold value T1, e.g., 300 luxes. If a rainfall state is judged, then the automatic light controller 12 permits on the headlight 14 when the value of external illuminance outside of the vehicle is equal to or lower than a second predetermined illuminance value as a second threshold value T2, e.g., 900 luxes, which is higher than the first predetermined illuminance value.

Figure 2:
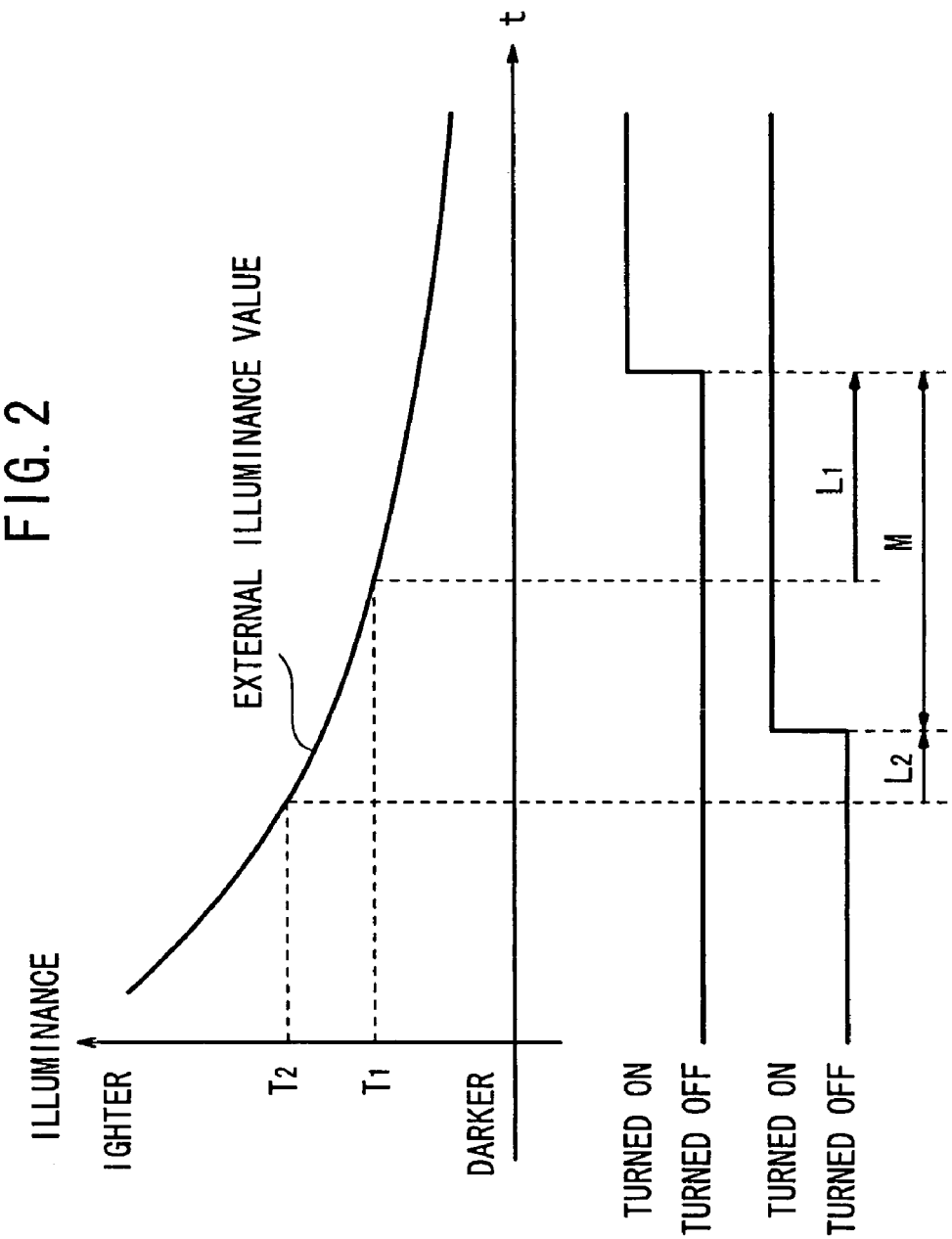
FIG. 2 is a diagram showing the manner in which headlights are turned on and off upon a rainfall and a non-rainfall by the vehicular automatic light control apparatus according to the embodiment of the present invention.

Specifically, as shown in FIG. 2, if a non-rainfall state is judged, then the automatic light controller 12 turns on the headlight 14 with a delay time L1 when the external illuminance becomes and is continuously equal to or lower than the first threshold value T1. If a rainfall state is judged, then the automatic light controller 12 permits on the headlight 14 to be turned on with a delay time L2 (L2<L1) when the external illuminance becomes and is continuously equal to or lower than the second threshold value T2. In the rainfall state, therefore, the automatic light controller 12 turns on the headlight 14 earlier by M (=L2−L1) than in the non-rainfall state.

The headlight 14 is turned on and off in the non-rainfall state and the headlight 14 is turned on and off in the rainfall state, as shown in FIG. 2. The rainfall state and the non-rainfall state are illustrated respectively as S1, S3 in FIG. 3. The present invention is primarily concerned with a rainfall to non-rainfall judging routine S2 for judging a shift from the rainfall state S1 to the non-rainfall state S3. A non-rainfall to rainfall judging routine S4 for judging a shift from the non-rainfall state S3 to the rainfall state S1 has been proposed in Japanese Patent Application No. 2004-103519 as described above.

As shown in FIG. 4, the automatic light controller 12 has, as functional components, a non-rainfall judging circuit 26 for judging a shift from the rainfall state to the non-rainfall state, and a turn-on threshold controller 27 for controlling a threshold value for turning on the headlight 14 based on an output signal from the non-rainfall judging circuit 26.

The non-rainfall judging circuit 26 has, as functional components, a headlight turn-on/off detector 21, a wiper non-operation period detector 22, an external illuminance detector 23, a tunnel passage detector 24, and a judging unit 25.

The headlight turn-on/off detector 21 is supplied with the automatic light switch signal through the combination switch 15 and the detected signal representing the external illuminance from the illuminance sensor 11, and detects whether the headlight 14 is turned on or off based on the automatic light switch signal and the detected signal representing the external illuminance. The wiper non-operation period detector 22 detects whether the wiper non-operation period is continuous for the preset first period, e.g., 30 seconds, or for the preset second period, e.g., 15 seconds, based on a changing period of the wiper operation signal.

The external illuminance detector 23 determines whether or not an average illuminance value calculated by averaging the external illuminance detected from the detected signal of the illuminance sensor 11 over each predetermined period is equal to or higher than a predetermined illuminance value, e.g., 2000 luxes. The tunnel passage detector 24 detects when the vehicle is passing through a tunnel based on a detected output signal from the illuminance sensor 11 when it detects light emitted from sodium-vapor lamps that are installed at regular intervals in the tunnel. The judging unit 25 judges a shift from the rainfall state to the non-rainfall state based on the detected output signal representing the turn-on or turn-off state of the headlight 14 from the headlight turn-on/off detector 21, the detected output signal from the wiper non-operation period detector 22, the detected output signal from the external illuminance detector 23, and the detected output signal from the tunnel passage detector 24. When a shift from the rainfall state to the non-rainfall state is judged, the turn-on threshold controller 27 changes from the second threshold value T2 to the first threshold value T1.

Figure 3:
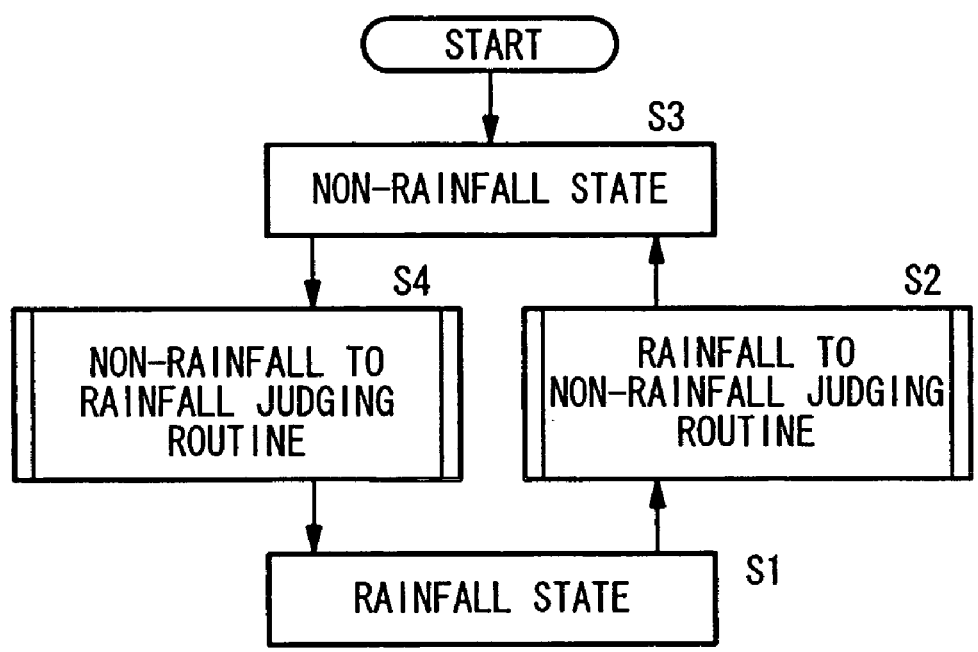
FIG. 3 is a flowchart of an automatic light control process performed by the vehicular automatic light control apparatus according to the embodiment of the present invention.

An operation sequence which is carried out by the automatic light controller 12 will be described below with reference to FIGS. 3 and 5.

At the start of the operation sequence, when the ignition switch is turned on and the automatic light switch 16 is turned on, the headlight 14 starts to be automatically controlled in the non-rainfall state S3. At this time, the first threshold value T1 represents an illuminance of 300 luxes. If the delay time is omitted for illustrative purpose, then the headlight 14 is turned on when the illuminance is equal to or lower than the first threshold value T1, and the headlight 14 is turned off when the illuminance is in excess of the first threshold value T1. The non-rainfall to rainfall judging routine S4 is now executed. If the rainfall state S1 is judged, then the turn-on threshold controller 27 changes from the first threshold value T1 to the second threshold value T2 which represents an illuminance of 900 luxes. If the delay time is omitted for illustrative purpose, then the headlight 14 is turned on when the illuminance is equal to or lower than the second threshold value T2, and the headlight 14 is turned off when the illuminance is in excess of the second threshold value T2.

From the rainfall state S1, the rainfall to non-rainfall judging routine S2 is executed. In the rainfall to non-rainfall judging routine S2, it is checked whether the entire headlight 14, i.e., the headlamp (H/L) LO and the small lamp, is turned off or not based on the detected output signal from the headlight turn-on/off detector 21 in step S21 shown in FIG. 5. If it is judged in step S21 that the entire headlight 14 is turned off, it is checked whether the wiper has not operated for 30 seconds or not based on the detected output signal from the wiper non-operation period detector 22 in step S22. If it is judged in step S22 that the wiper has not been inactivated for 30 seconds, then the rainfall state is judged as being continued.

If it is judged in step S22 that the wiper has not operated for 30 seconds, then a shift from the rainfall state to the non-rainfall state is judged. The turn-on threshold controller 27 changes from the second threshold value T2 of 900 luxes to the first threshold value T1 of 300 luxes. The headlight 14 is now controlled in the non-rainfall state S3.

If it is judged in step S21 that the entire headlight 14 is not turned off, then it is checked whether or not a calculated (or determined) average illuminance value (indicated as the external illuminance in FIG. 5) determined by the external illuminance detector 23 is equal to or higher than 2000 luxes in step S23. If it is judged in step S23 that the calculated average illuminance value is equal to or higher than 2000 luxes, then a shift from the rainfall state to the non-rainfall state is judged. The turn-on threshold controller 27 changes from the second threshold value T2 of 900 luxes to the first threshold value T1 of 300 luxes. The headlight 14 is now controlled in the non-rainfall state S3.

If it is judged in step S23 that the calculated average illuminance value is less than 2000 luxes, then it is checked whether the wiper has not operated for 15 seconds or not based on the detected output signal from the wiper non-operation period detector 22 in step S24. If it is judged in step S24 that the wiper has not been inactivated for 15 seconds, then the rainfall state is judged as being continued.

If it is judged in step S24 that the wiper has not operated for 15 seconds, then it is checked whether the vehicle is passing through a tunnel or not based on the detected output signal from the tunnel passage detector 24 in step S25. If it is judged in step S25 that the vehicle is not passing through a tunnel, then the rainfall state is judged as being continued.

If it is judged in step S25 that the vehicle is passing through a tunnel, then a shift from the rainfall state to the non-rainfall state is judged. The turn-on threshold controller 27 changes from the second threshold value T2 of 900 luxes to the first threshold value T1 of 300 luxes. The headlight 14 is now controlled in the non-rainfall state S3.

Figure 6A:
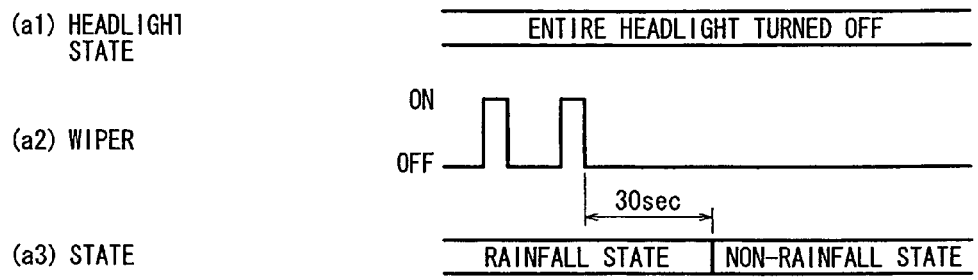
FIGS. 6A through 6C are diagrams illustrative of operation of the vehicular automatic light control apparatus according to the embodiment of the present invention.

In the rainfall to non-rainfall judging routine S2 (S21 through S25), while in the rainfall state, when the entire headlight 14, i.e., the headlamp (H/L) LO and the small lamp, is turned off and the wiper has not operated for 30 seconds (the wiper operation signal has not changed for 30 seconds), i.e., if the entire headlight 14 is turned off in step S21 and the wiper has not operated for 30 seconds in step S22, control goes to the non-rainfall state. This is schematically illustrated in FIG. 6A. In FIG. 6A, the turned-on or off state of the headlight 14 is shown at (a1), the state of the wiper at (a2), and the rainfall state and the non-rainfall state at (a3).

Figure 6B:
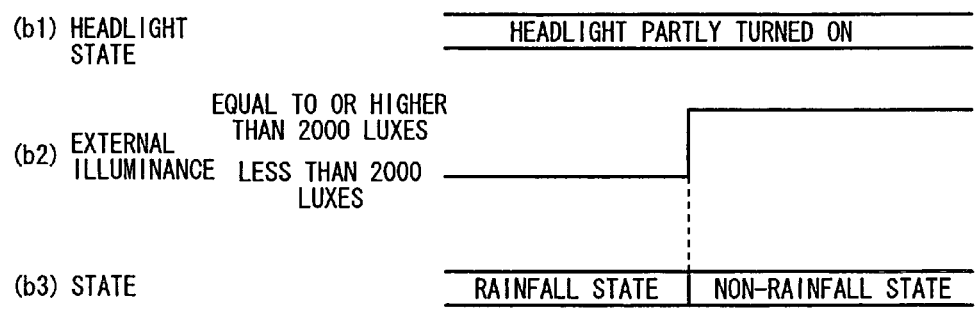

In rainfall to non-rainfall judging routine, while in the rainfall state, when the headlight 14 is partly turned on (the small lamp or the headlamp (H/L) LO is turned on), and the calculated average illuminance value is equal to or higher than 2000 luxes, i.e., if the entire headlight 14 is not turned off in step S21 and the calculated average illuminance value is equal to or higher than 2000 luxes in step S23, control goes to the non-rainfall state. This is schematically illustrated in FIG. 6B. In FIG. 6B, the turned-on or off state of the headlight 14 is shown at (b1), the state of the calculated average illuminance value (indicated as the external illuminance in FIG. 6B) at (b2), and the rainfall state and the non-rainfall state at (b3).

Figure 6C:
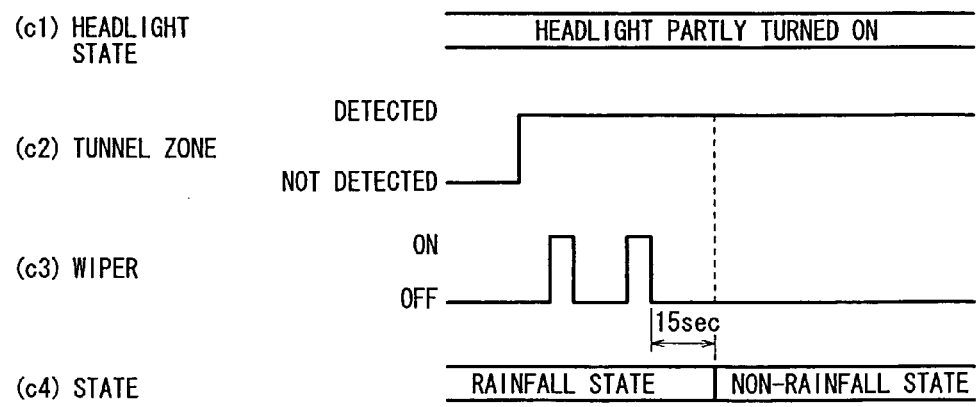

In rainfall to non-rainfall judging routine, while in the rainfall state, when the headlight 14 is,partly turned on (the small lamp or the headlamp (H/L) LO is turned on), the calculated average illuminance value is less than 2000 luxes, the wiper has not operated for 15 seconds (the wiper operation signal has not changed for 15 seconds), and the vehicle is passing through a tunnel, i.e., if the entire headlight 14 is not turned off in step S21, the calculated average illuminance value is less than 2000 luxes in step S23, the wiper has not operated for 15 seconds in step S24, and the vehicle is passing through a tunnel, control goes to the non-rainfall state. This is schematically illustrated in FIG. 6C. In FIG. 6C, the turned-on or off state of the headlight 14 is shown at (c1), the passage of the vehicle through a tunnel at (c2), the state of the wiper at (c3), and the rainfall state and the non-rainfall state at (c4).

According to the present invention, as described above, it is possible with a simple arrangement to determine a shift from a rainfall state to a non-rainfall state and a switch from the threshold value T2 for the rainfall state to the threshold value T1 for the non-rainfall state.

Although a certain preferred embodiment of the present invention has been shown and described in detail, it should be understood that various changes and modifications may be made therein without departing from the scope of the appended claims.

What is claimed is:

1. A vehicular automatic light control apparatus comprising:
   a wiper status detection device for judging a non-rainfall state or a rainfall state based on information about a wiping operation of a windshield wiper of a vehicle;
   a light sensor for detecting external illuminance;
   a headlight control device for turning on a headlight if an external illuminance value outside of the vehicle is equal to or lower than a first illuminance threshold value if the non-rainfall state is judged, and for turning the headlight on if the external illuminance value is equal to or lower than a second illuminance threshold value, which is higher than said first illuminance threshold value, if the rainfall state is judged,
   said headlight control device comprising:
   an average illuminance value calculator for determining an average illuminance value of the detected external illuminance in predetermined periods when the vehicle is capable of being driven; and
   a threshold switching device for switching an operating threshold between the second illuminance threshold value and the first illuminance threshold value under different conditions based on whether the headlight is turned on or off;
   wherein said threshold switching device switches the operating threshold from the second illuminance threshold value to the first illuminance threshold value when the determined average illuminance value is equal to or greater than a predetermined value and the headlight is turned on, and switches the operating threshold from the second threshold value to the first threshold value when the wiping operation of the wiper has not been confirmed for another predetermined period and the headlight is turned off.

2. A vehicular automatic light control apparatus according to claim 1, further comprising:
   a tunnel detecting device for detecting when the vehicle is passing through a tunnel;
   wherein said switching device switches from the second illuminance threshold value to the first illuminance threshold when the wiping operation of the wiper has not been confirmed for a second predetermined period,
   wherein the vehicle is determined to be passing through a tunnel by said tunnel detecting device when the headlight is turned on and when the determined average illuminance value is less than the predetermined value.

3. A vehicular automatic light control apparatus according to claim 2, wherein said tunnel detecting device detects that the vehicle is passing through a tunnel when a predetermined external illuminance value is detected in common intervals.

4. A vehicular automatic light control apparatus according to claim 1, wherein the wiper status detection device is operable to determine wiping operation of the wiper by counting revolutions of a wiper drive shaft during a predetermined time period.

5. A vehicular automatic light control apparatus according to claim 1, wherein the second illuminance threshold value has an integer value greater than the first illuminance threshold value.

6. A vehicular automatic light control apparatus according to claim 1, wherein the first illuminance threshold value is 300 luxes and the second illuminance threshold value is 900 luxes.

7. A vehicular automatic light control apparatus according to claim 1, wherein the non-rainfall state is determined when the wiping operation of the wiper has not been confirmed for 30 seconds.

8. A vehicular automatic light control apparatus comprising:
   a wiper status detection device for judging a non-rainfall state or a rainfall state based on information about a wiping operation of a windshield wiper of a vehicle, wherein the wiper status detection device determines wiping operation of the wiper by counting a number of revolutions of a wiper drive shaft during a predetermined time period;

a light sensor for detecting external illuminance; and a headlight control device comprising:

an average illuminance value calculator for determining an average illuminance value of the external illuminance in predetermined periods when the vehicle is capable of being driven; and a threshold switching device for switching an operating threshold between the second illuminance threshold value and the first illuminance threshold value under different conditions based on whether the headlight is turned on or off;

wherein, if the non-rainfall state is judged, said headlight control device turns on a headlight if an external illuminance value outside of the vehicle is equal to or lower than a first illuminance threshold value, and if the rainfall state is judged, said headlight control device turns on the headlight if the external illuminance value is equal to or lower than a second illuminance threshold value, which is higher than said first illuminance threshold value, wherein the illuminance values are integers, and wherein said threshold switching device switches the operating threshold from the second illuminance threshold value to the first illuminance threshold value when the headlight is turned on and the determined average illuminance value is equal to or greater than a predetermined value, and switches the operating threshold from the second threshold value to the first threshold value when the headlight is turned off and the wiping operation of the wiper has not been confirmed for another predetermined time period.

9. A vehicular automatic light control apparatus according to claim 8, wherein the second illuminance threshold value has an integer value greater than the first illuminance threshold value.

10. A vehicular automatic light control apparatus according to claim 8, wherein the first illuminance threshold value is 300 luxes and the second illuminance threshold value is 900 luxes.

11. A vehicular automatic light control apparatus according to claim 8, wherein the non-rainfall state is determined when the wiping operation of the wiper has not been confirmed for 30 seconds.

* * * * *